(12) United States Patent
Vishwanathan et al.

(10) Patent No.: US 7,751,848 B2
(45) Date of Patent: Jul. 6, 2010

(54) SYSTEMS AND METHODS FOR PROVIDING CONCURRENT MOBILE APPLICATIONS TO MOBILE COMMUNICATION DEVICES

(75) Inventors: Kumar K. Vishwanathan, Windham, NH (US); Prakash R. Iyer, N. Andover, MA (US); Rangamani Sundar, Windham, NH (US)

(73) Assignee: ENVIO Networks Inc., Andover, MA (US)

(*) Notice: Subject to any disclaimer, the term of this patent is extended or adjusted under 35 U.S.C. 154(b) by 856 days.

(21) Appl. No.: 11/602,291

(22) Filed: Nov. 21, 2006

(65) Prior Publication Data

US 2007/0118662 A1   May 24, 2007

Related U.S. Application Data

(60) Provisional application No. 60/738,969, filed on Nov. 23, 2005.

(51) Int. Cl.
*H04M 1/00* (2006.01)
*H04B 1/38* (2006.01)

(52) U.S. Cl. .............. 455/550.1; 455/552.1; 455/556.2; 455/557; 455/560; 455/567

(58) Field of Classification Search ... 455/412.1–412.2, 455/414.1–414.4, 416, 418–420, 432.3, 450–451, 455/466, 500, 507–509, 514, 517, 550.1, 455/552.1, 556.1–556.2, 557–558, 560–561, 455/566–567; 370/310, 312–314, 328–329, 370/336–338, 341, 344–345, 349, 442, 458–459, 370/460, 487, 529, 537; 709/202–203, 218–219, 709/221–222, 227–229, 244; 715/733–734, 715/744–749, 738–740, 201–202; 348/13.1–14.3, 348/E5.008–E5.009, 14.03–14.04; 717/169, 717/173, 178; 719/322–323, 328–329, 311, 719/318, 320; 379/88.11–88.13, 88.17, 265, 379/908

See application file for complete search history.

(56) References Cited

U.S. PATENT DOCUMENTS

| 5,751,707 | A | 5/1998 | Voit et al. |
| 6,185,196 | B1 | 2/2001 | Mademann |
| 6,363,357 | B1 | 3/2002 | Rosenberg et al. |
| 6,400,958 | B1 | 6/2002 | Isomursu et al. |
| 6,501,957 | B2 | 12/2002 | Muhonen et al. |
| 6,608,637 | B1 * | 8/2003 | Beaton et al. ............... 715/762 |
| 6,807,529 | B2 | 10/2004 | Johnson et al. |

(Continued)

*Primary Examiner*—Meless N Zewdu
(74) *Attorney, Agent, or Firm*—Edell, Shapiro & Finnan, LLC

(57) ABSTRACT

A system is provided that enables the delivery of multiple concurrent mobile applications to a mobile communication device. A concurrency application server interfaces to a mobile switching center to obtain call parameters in order to determine a context of a mobile device call. The concurrency application server also interfaces with equipment in a data network. A concurrency application plug-in resides on the mobile communication device to enable the device to switch between two or more active mobile applications on the device, either under user control or automatically. The concurrency application server determines a context of a call or other activity engaged by the mobile device user to determine what additional content to deliver for display on the mobile device, or what other mobile applications to invoke for the mobile device.

29 Claims, 11 Drawing Sheets

U.S. PATENT DOCUMENTS

| | | |
|---|---|---|
| 6,845,236 B2 | 1/2005 | Chang |
| 6,912,389 B2 | 6/2005 | Bright et al. |
| 6,912,581 B2 | 6/2005 | Johnson et al. |
| 6,973,324 B2 | 12/2005 | Weisshaar et al. |
| 6,996,394 B2 | 2/2006 | Minear et al. |
| 7,237,006 B1 * | 6/2007 | Prell .................... 709/205 |
| 7,565,133 B2 * | 7/2009 | Yamada et al. ............ 455/405 |
| 2001/0041561 A1 | 11/2001 | Ventulett et al. |
| 2002/0131564 A1 * | 9/2002 | Wu ....................... 379/88.12 |
| 2003/0032409 A1 | 2/2003 | Hutcheson et al. |
| 2003/0054807 A1 | 3/2003 | Hsu et al. |
| 2004/0053602 A1 | 3/2004 | Wurzburg |
| 2004/0137885 A1 | 7/2004 | Sarkkinen et al. |
| 2005/0031097 A1 | 2/2005 | Rabenko et al. |
| 2005/0166056 A1 | 7/2005 | Yamanaka |
| 2005/0181773 A1 | 8/2005 | Chang |
| 2005/0197143 A1 | 9/2005 | Lee et al. |
| 2005/0245241 A1 | 11/2005 | Durand et al. |
| 2005/0250480 A1 | 11/2005 | Annic |
| 2005/0250534 A1 | 11/2005 | Maurer |
| 2005/0260974 A1 | 11/2005 | Lee et al. |
| 2005/0289630 A1 | 12/2005 | Andrews et al. |
| 2006/0004627 A1 | 1/2006 | Baluja |
| 2006/0053090 A1 * | 3/2006 | Cotter et al. .................. 707/3 |
| 2006/0153073 A1 * | 7/2006 | Ghiware et al. ............. 370/230 |
| 2006/0221939 A1 * | 10/2006 | Rosen et al. ................ 370/352 |
| 2006/0274701 A1 * | 12/2006 | Albertsson ................. 370/338 |
| 2006/0288107 A1 * | 12/2006 | Klassen et al. ............. 709/227 |
| 2007/0014280 A1 | 1/2007 | Cormier et al. |

\* cited by examiner

SYSTEMS AND METHODS FOR PROVIDING CONCURRENT MOBILE APPLICATIONS TO MOBILE COMMUNICATION DEVICES

RELATED APPLICATION

This application claims priority to U.S. Provisional Application No. 60/738,969, filed Nov. 23, 2005, the entirety of which is incorporated herein by reference.

FIELD OF THE INVENTION

The present invention is directed to mobile communication devices and services, and more particularly to delivering context based multiple concurrent applications or services to a mobile communication device.

BACKGROUND OF THE INVENTION

Mobile communication devices, e.g. cellular phones, are becoming more data centric and less voice centric and the modern mobile lifestyle is changing rapidly. Indeed, in many countries, the mobile phone is the "primary screen" in the household instead of a laptop or desktop computer. Nevertheless, today's mobile communication services are not capable of providing multiple concurrent applications to a mobile communication device.

SUMMARY OF THE INVENTION

Briefly, a system is provided that enables the delivery of multiple concurrent mobile applications spanning voice and data networks to a mobile communication device. A concurrency application server interfaces to a mobile switching center to obtain call parameters in order to determine a context of a mobile device call. The call context information includes one or more pieces of information such as the called number, the calling number (i.e., an identifier of the mobile device making the call), time of day of the call, and the location of the mobile device when making the call. The concurrency application server also interfaces with equipment in a data network. A concurrency application software plug-in resides on the mobile communication device to enable the device to switch between two or more active mobile applications on the device, either under user control or automatically.

Objects and advantages of the techniques described herein will become more readily apparent when reference is made to the following description taken in conjunction with the accompanying drawings.

DETAILED DESCRIPTION

Figure 1:
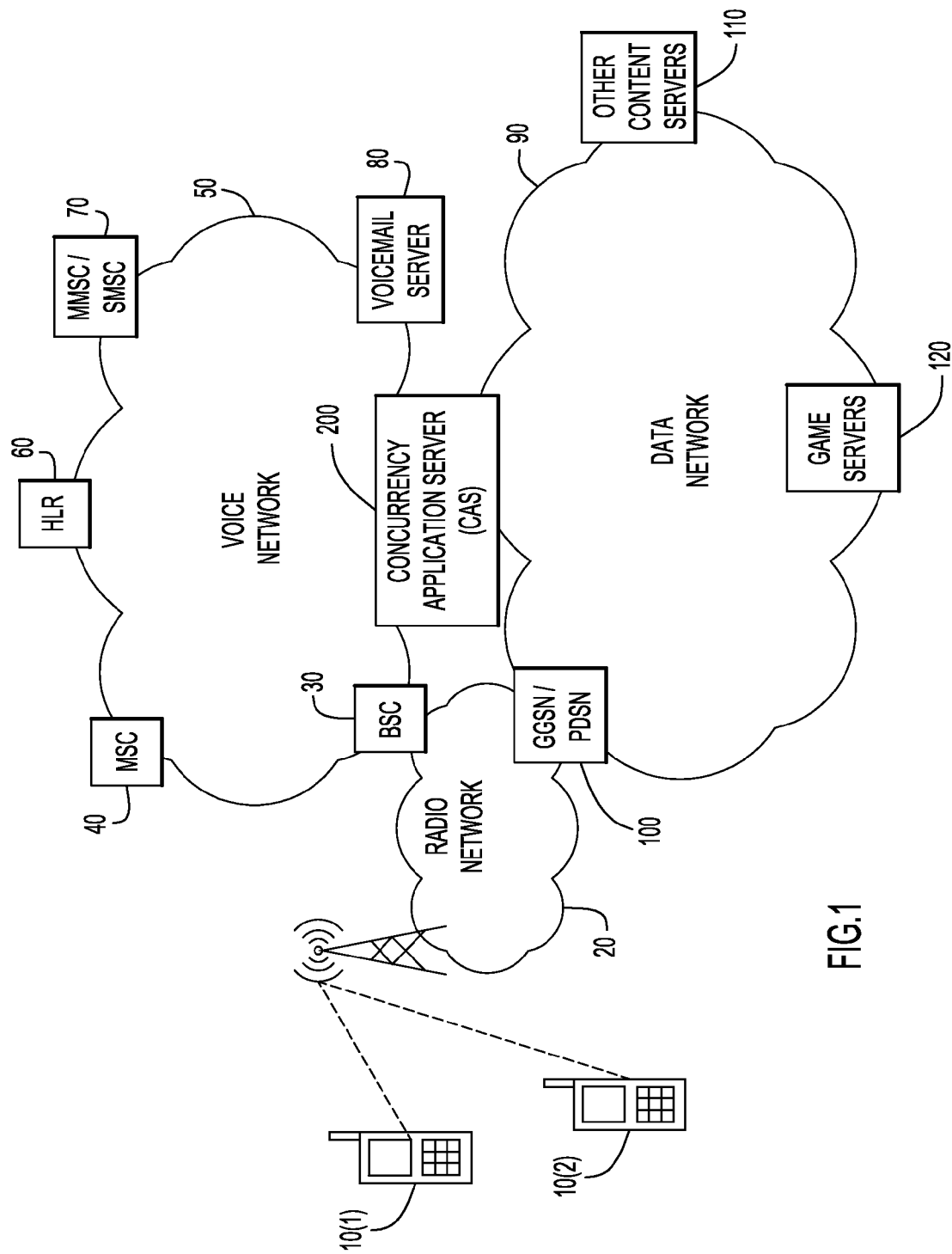
FIG. 1 is a high level block diagram showing a mobile communication system that is enhanced according to the techniques of the invention described herein to deliver concurrent applications to mobile communication devices.
Figure 2:
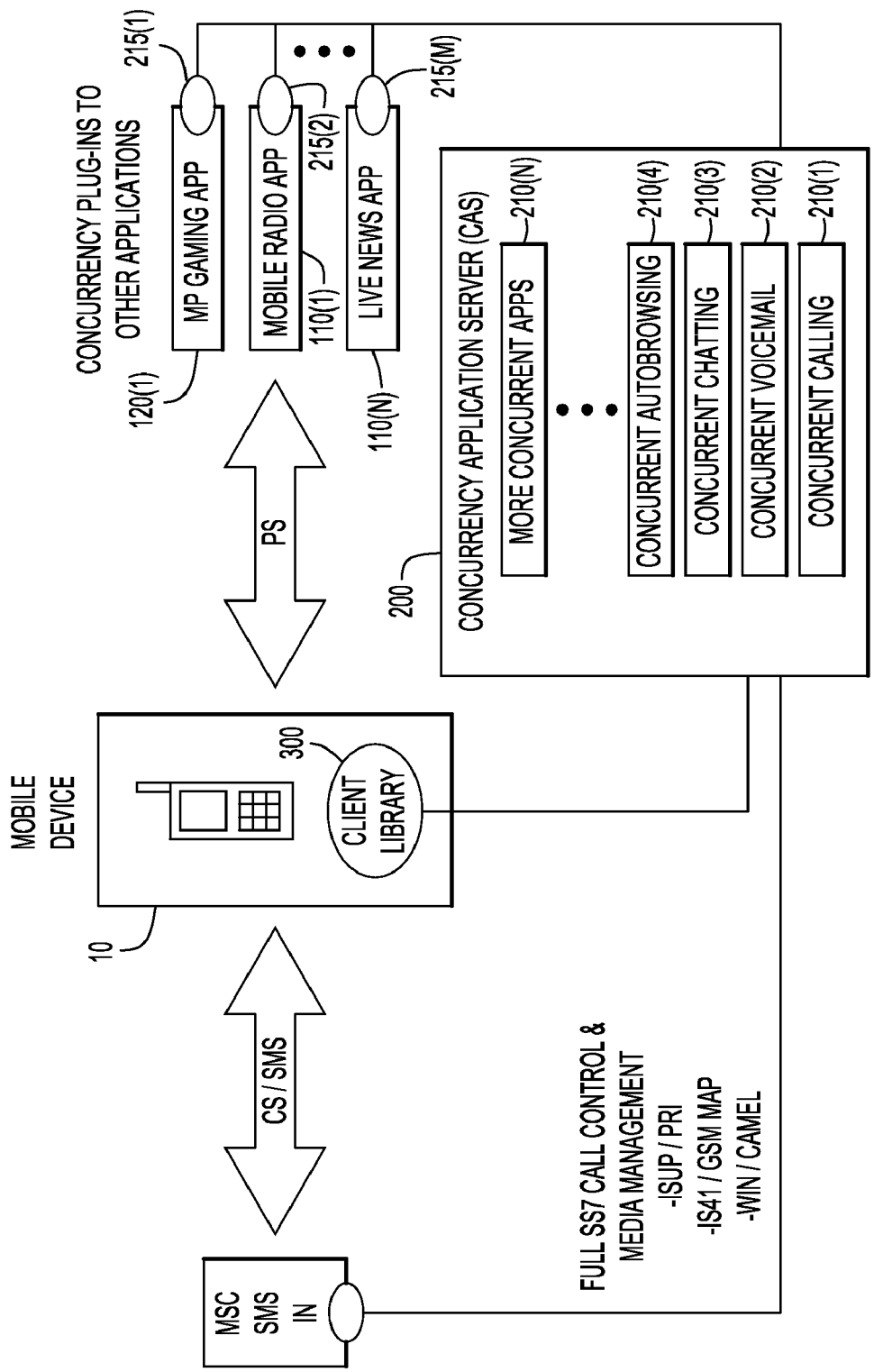
FIG. 2 is a high level data flow diagram showing a concurrency application server that communications with a library component in a mobile device according to the present invention.

Referring first to FIGS. 1 and 2, the system and method for providing concurrent applications to mobile devices will be described. The mobile communication devices are shown at reference numeral 10 and may be cellular phone or other wireless communication devices that have sufficient display and user interface capability beyond simple telephony functions. Such devices are currently available and they have capabilities including mobile web browsing, mobile instant messaging and related capabilities. However, there is no capability heretofore known for providing concurrent applications to the mobile communication device so that the user can be placing or having a voice call and concurrently receiving other content or engaging in another communication related activity that is displayed on the display screen of the mobile device, or vice versa.

As is known in the art, mobile communication devices 10(1)-10(N) achieve a wireless radio communication link via a radio network 20 to base station control centers (BSCs) 30 and the BSCs 30 are in turn connected to a mobile switching center (MSC) 40 that is part of a voice network 50. Also in the voice network 50 is a home location register (HLR) 60 and a multimedia messaging service center/short message service center (MMSC/SMSC) 70 and a voicemail server 80. The MMSC/SMSC 70 handles processing of data messages to/from a mobile communication device. The radio network 20 is also connected to a data or packet network 90 by a GSM gateway serving node (GGSN)/packet data serving node (PDSN) 100. The data network 90 may include servers 100 that are accessible via the WWW for various content as well as game servers 120.

According to the present invention, a concurrent mobile device application system is provided that comprises a concurrency application server (CAS) 200 and a small client library 300 also called a concurrency application plug-in that resides in the mobile devices 10(1) to 10(N). The CAS 200 interfaces with equipment in the voice network 50 and equipment in the data network 90, e.g., the Internet. A mobile device 10(i) equipped with the concurrency application plug-in is said to be a concurrency-enabled mobile device. Thus, any currently available or hereinafter developed mobile device having the aforementioned user interface capabilities may be made concurrency-enabled by installing the client library 300 or otherwise configured with the functionality of the client library 300 as described herein. For example, the client library functionality may made part of the operating system of a mobile device.

The CAS 200 comprises an interface function (described hereinafter) that detects incoming calls or communication sessions that may be originate from an MSC or MMSC/SMSC. Depending on which concurrent applications the mobile device user has subscribed, the CAS 200 activates a mobile application. The CAS 200 comprises a plurality of mobile applications 210(1) to 210(N) that can be running concurrently in cooperation with a client library 300 on any number of mobile devices 10. Examples of mobile applications include a voice calling application 210(1), voice mail application 210(2), chatting application 210(3) and auto-browsing application 210(4). Additional mobile applications are described hereinafter. The mobile applications 210(1) to 210(N) may interface with third party applications 110(1) to 110(N) which may include, for example, a mobile radio application 110(1) and a live news application 110(N), as well as a mobile gaming application 120(1). The CAS 200 comprises concurrent application plug-ins 215(1) to 215(M) to enable interaction between the CAS applications and the third party applications.

A concurrent mobile application may be initiated by the CAS 200 as explained above or by the mobile device as well. For example, the client library 300 on the mobile device may activate a mobile application based on an incoming call or certain incoming message notifications. Thus, the mobile device or the CAS 200 may detect the need for concurrency and activate a mobile application concurrent with an already activated mobile application.

Figure 3:
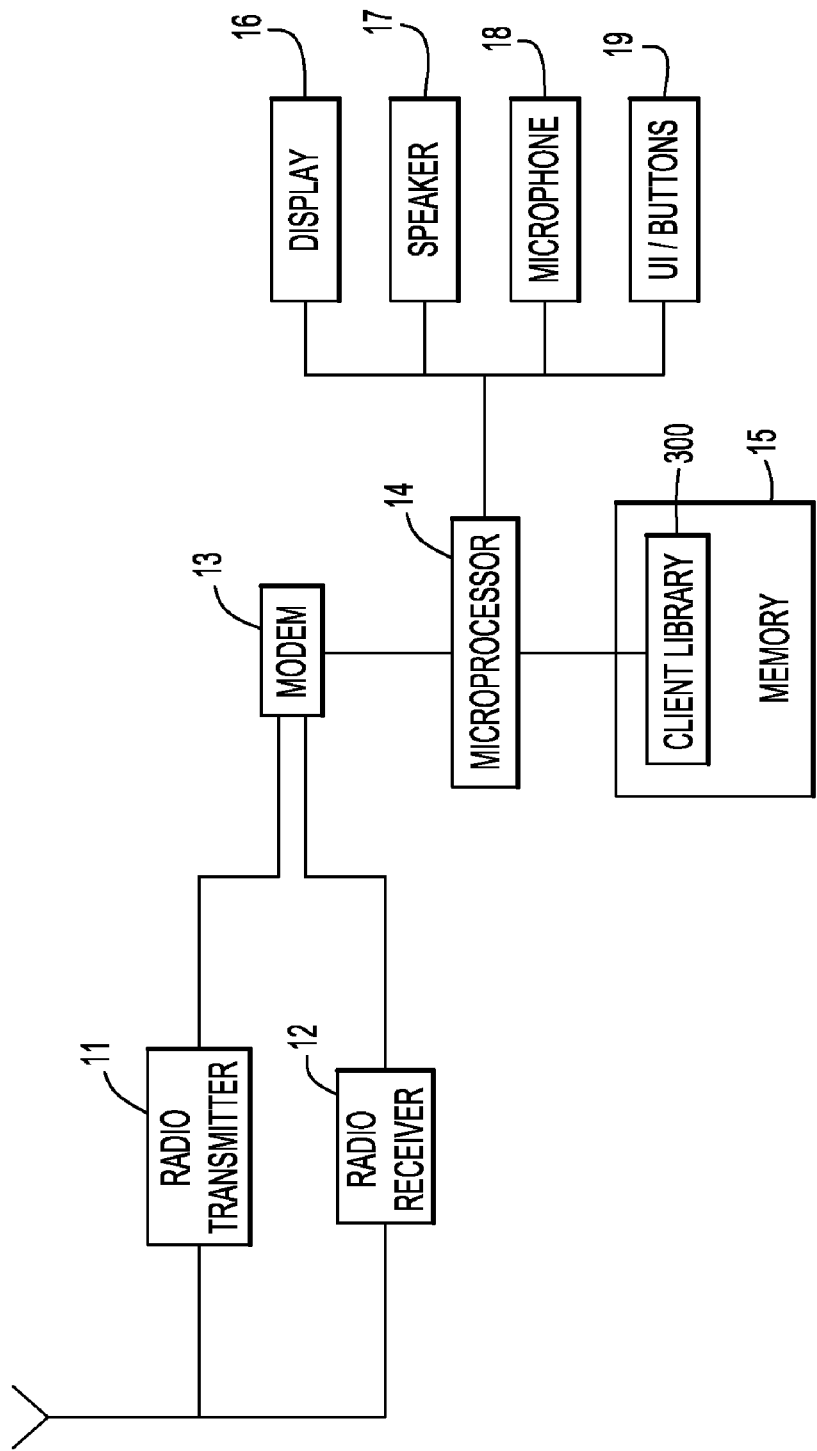
FIG. 3 is a block diagram of a mobile communication useful in accordance with the embodiments of the present invention.

FIG. 3 illustrates a block diagram of a mobile device 10 according to one embodiment. The mobile device 10 comprises a radio transmitter 11, a radio receiver 12, a modem (baseband signal processor) 13, microprocessor 14, memory 15 and a variety of user interface components such as a display 16, speaker 17, microphone 18 and user interface buttons 19. The functions of many of the components are well known in the art and are therefore not described in detail herein. The client library 300 is installed in the memory 15. In addition to the client library 300, the memory 15 stores other software programs that are executed by the microprocessor 14 to provide the various mobile device functions to the user and coordinate cooperation with the CAS 200. The mobile device 10 need have only one instance each of a radio transmitter 11 and a radio receiver 12 to provide for multiple concurrent mobile applications to the device user. No modification to the hardware of a mobile device is necessary to achieve the concurrent mobile application functionality described herein. Moreover, no modification of the over-the-air communication protocol (between a mobile device and the radio network 20) is necessary to provide the concurrent application functionality described herein.

Figure 4A:
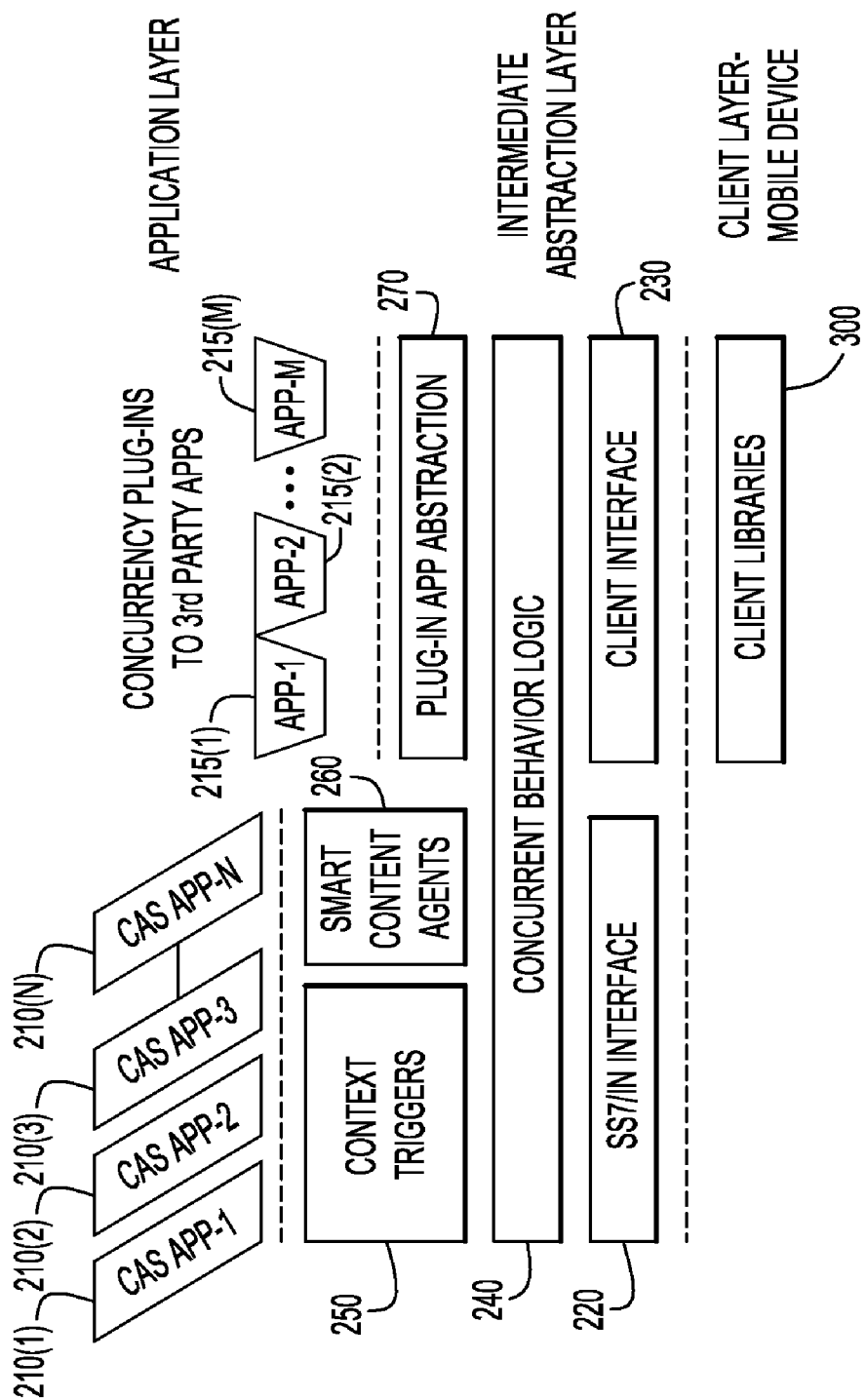
FIG. 4A is a block diagram of the software architecture of the concurrency application system according to the present invention.

FIG. 4A illustrates an example of a software architecture for the concurrency application system functionality. As mentioned above, at the client layer there is a client library (concurrency application plug-in enabler) 300 that resides in the mobile device 10 that can activate an application while others are already active on the mobile device 10 and can switch an active application between the foregoing and background, either in response to a user control or automatically.

At an intermediate abstraction layer there is a SS7/IN interface function 220 and a client interface function 230. The SS7/IN interface function 220 detects call context information from a mobile device call. Call context information includes, but not limited to, information such as the mobile device ID, telephone number of the mobile device, the number called by the mobile device, etc., obtained from the MSC and location of the mobile device or other information obtained from or via the GGSN/PDSN. The client interface function 230 receives any special data from the mobile device 10 and delivers concurrency application information or content to the mobile device 10 in the appropriate format depending on the capabilities of the mobile device. There is also a concurrent behavior logic function 240 that maintains a profile data file for each mobile device 10 as to the types of concurrent applications to be provided to a mobile device and parameters associated with the concurrent application, which applications are active or available on a particular mobile device, etc. Next, there are a context triggers function 250 and a smart content agents function 260. The context trigger function 250 determines what type of concurrent applications should be invoked for a mobile device based on the context of the current activity of the mobile device (type of call made, time of day of the call, location of the mobile device when a call is made, calling number of the call, duration of the call in progress, etc.). Other context triggers may be location based, such as the absolute location of a mobile device user as well as the proximity of one mobile device user to another mobile device user. The location information can be absolute GPS-based or relative RFID-based, technologies for which are known in the art and used or will be used in mobile communication networks and services. The smart content agents function 260 activates one or more concurrent applications to retrieve certain content relevant to the context of a mobile device call, under control of the context trigger function 250.

The appropriate one or more CAS applications (CAS App-1 to CAS App-n) 210(1) to 210(N) are called upon by the context trigger and smart content agents functions 250 and 260. In addition, there is a plug-in application abstraction function 270 that interfaces the concurrent behavior logic function 240 with one or more concurrency application plug-ins 215(1) to 215(M).

Figure 4B:
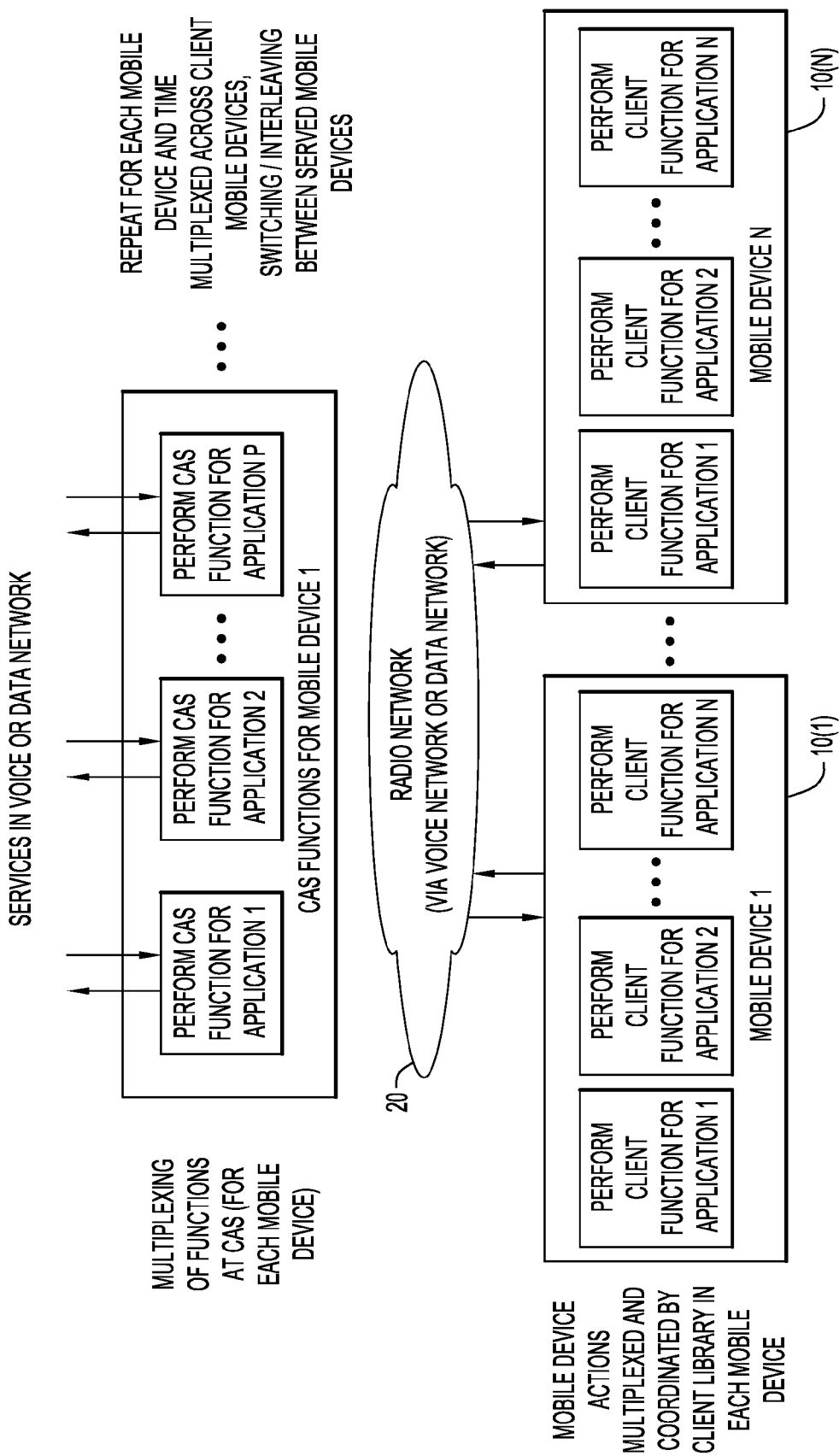
FIG. 4B is a flow diagram illustrating the time multiplexing behavior in a mobile device and concurrency application server according to an embodiment of the present invention.

FIG. 4B is a flow diagram that depicts how the CAS 200 and the mobile devices achieve the concurrent application functionality. As indicated above, each mobile device that has the client library functionality described above is capable of coordinating with the CAS to perform multiple mobile applications with the use of a single radio transmitter and single radio receiver. To this end, within each mobile device 10(1) to 10(N), the client library manages usage of the radio resources and processing resources, by way of time multiplexing, to perform functions for each of a plurality of applications (identified as application 1 to application P in mobile device 10(1)). Thus, to the user of a mobile device, multiple mobile applications are concurrently happening on the mobile device. Similarly, the CAS performs its CAS functions for each of the multiple applications it is concurrently serving on each mobile device 10(1) to 10(N). Thus, the CAS is also time multiplexing these functions across multiple applications for each mobile device, and across multiple mobile devices. For example, at one time interval, the CAS may perform functions associated with application 1 for mobile device 10(1), and at the next instant it may perform functions associated with application 1 for device 10(2), and so on, until it returns to performing a function for application 1 or another application for mobile device 10(1). Moreover, even though a particular application is active on a mobile device, it may be in a static or dormant state waiting for the mobile device user to provide input. Thus, the CAS and the client library coordinate activity therebetween so that each returns processing resources to a particular application only when required. The manner in which the CAS switches between applications and between mobile devices it serves depends on the nature of the urgency or priority of the applications. Thus, the CAS software manages priorities of the various applications among mobile devices so as to present a seamless concurrent application experience for each mobile device user.

Figure 5:
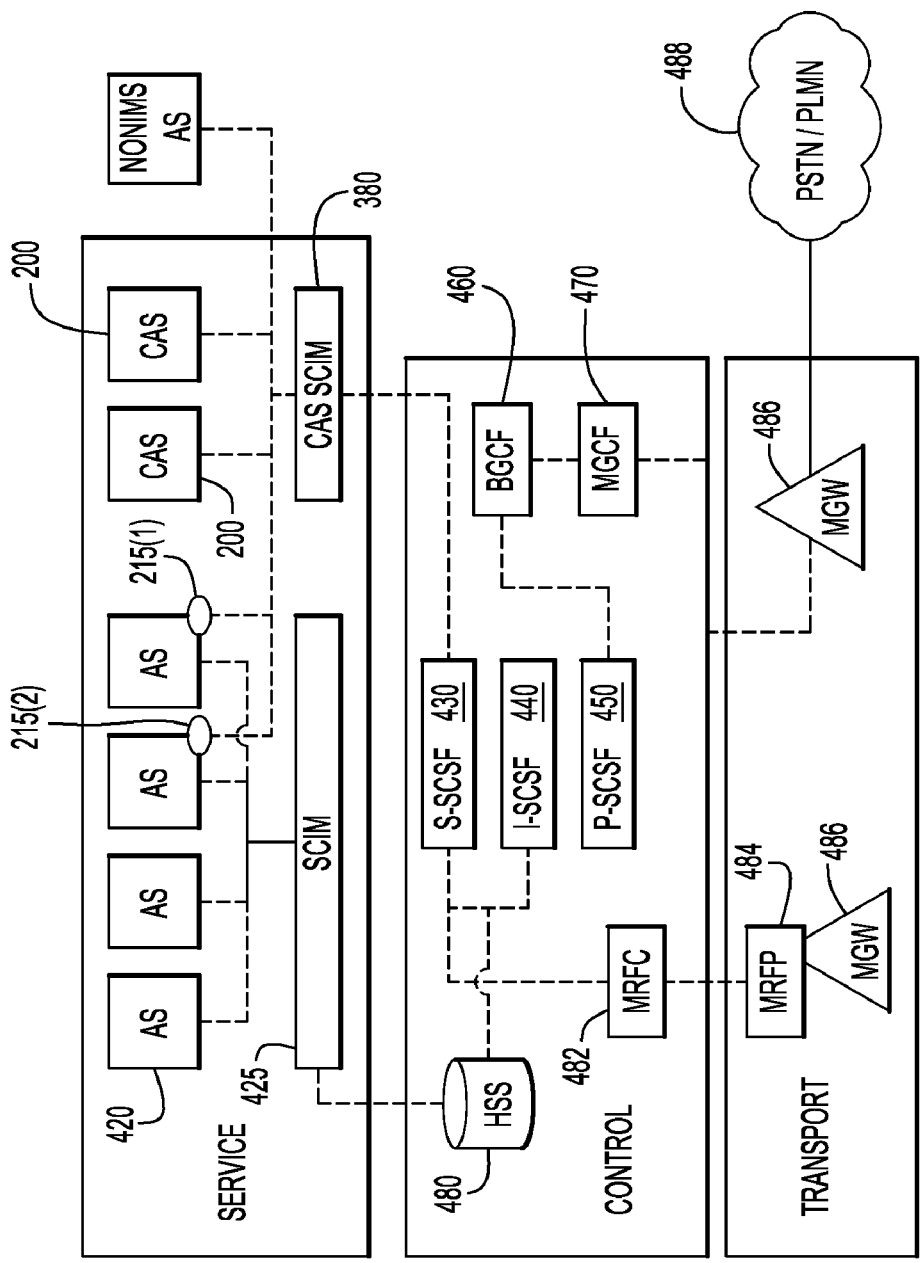
FIG. 5 is a block diagram showing how the concurrency application capability according to the present invention may integrate with the IP Multimedia Subsystem (IMS).

FIG. 5 illustrates how the concurrency application functionality may be integrated as part of the IP Media Subsystem (IMS) system architecture functionality having a service layer, control layer and transport layer. The CAS 200 functionality is provided at the service layer as application servers (AS's) which interface with a CAS service capability interaction management (SCIM) module 380. The CAS blocks shown in FIG. 5 may have application plug-ins 215 to other AS's 420. The CAS SCIM 380 interfaces with the serving call session control function (S-CSCF) 430 in the control layer. A SCIM module 425 interfaces the AS's 420 to the S-CSCF function 430 as well. As is known in the art, in the control layer there are also an interrogation call session control function (I-CSCF) 440, a proxy call session control function (P-CSCF) 450, border gateway control function (BGCF) 460 and a media gateway control function (MGCF) 470, a home subscriber server (HSS) 480 and a multimedia resource function controller (MRFC) 482. The MGCF 470 connects to the public switched telephone network (PSTN)/public land mobile network (PLMN) 488. In the transport layer, there is a multimedia resource function processor (MRFP) 284 and one or more media gateways (MGWs) 286.

Figure 6:
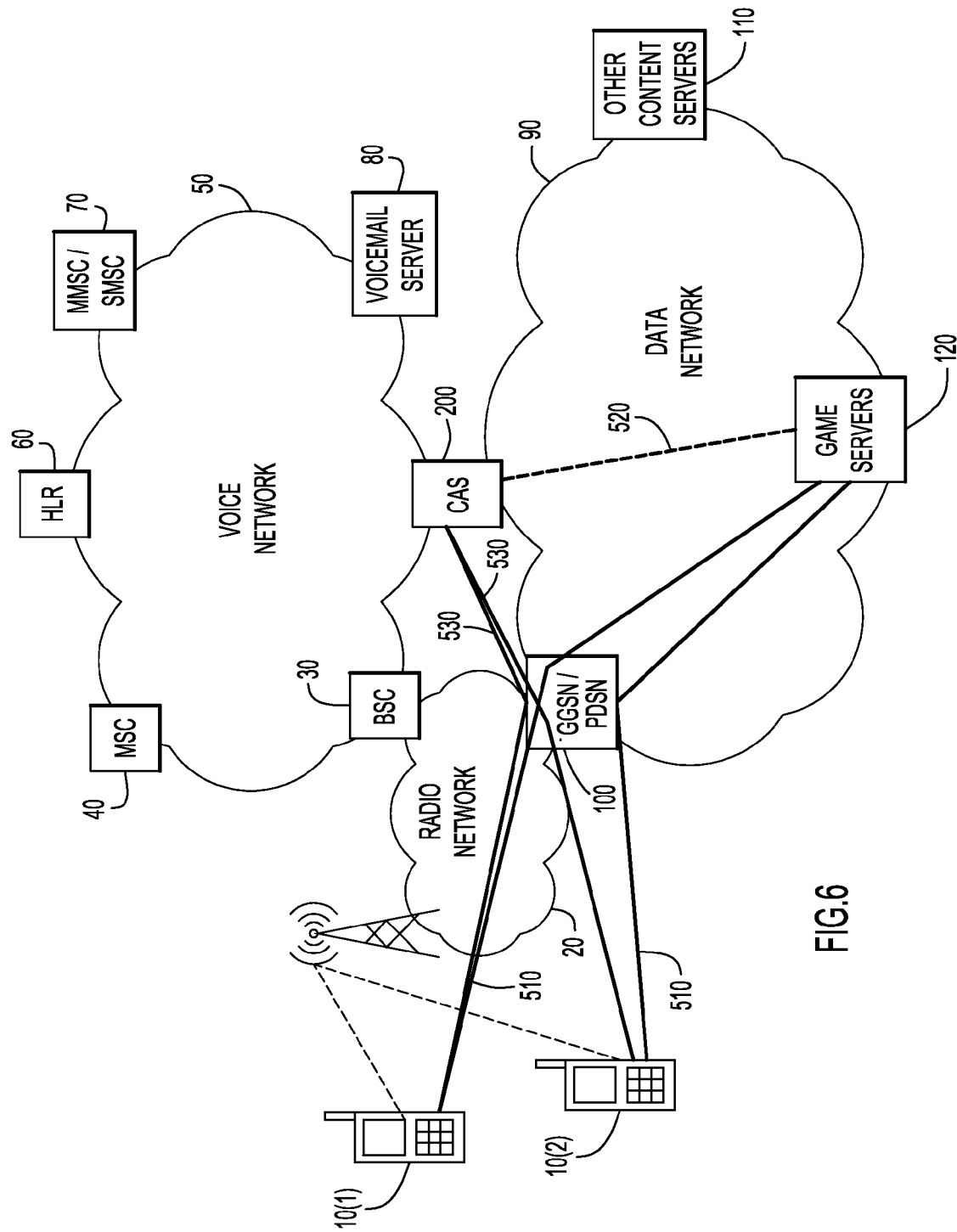
FIG. 6 is a block diagram showing an example of multiple concurrent applications delivered to mobile device users in the context of a gaming application according to an embodiment of the invention.
Figure 7:
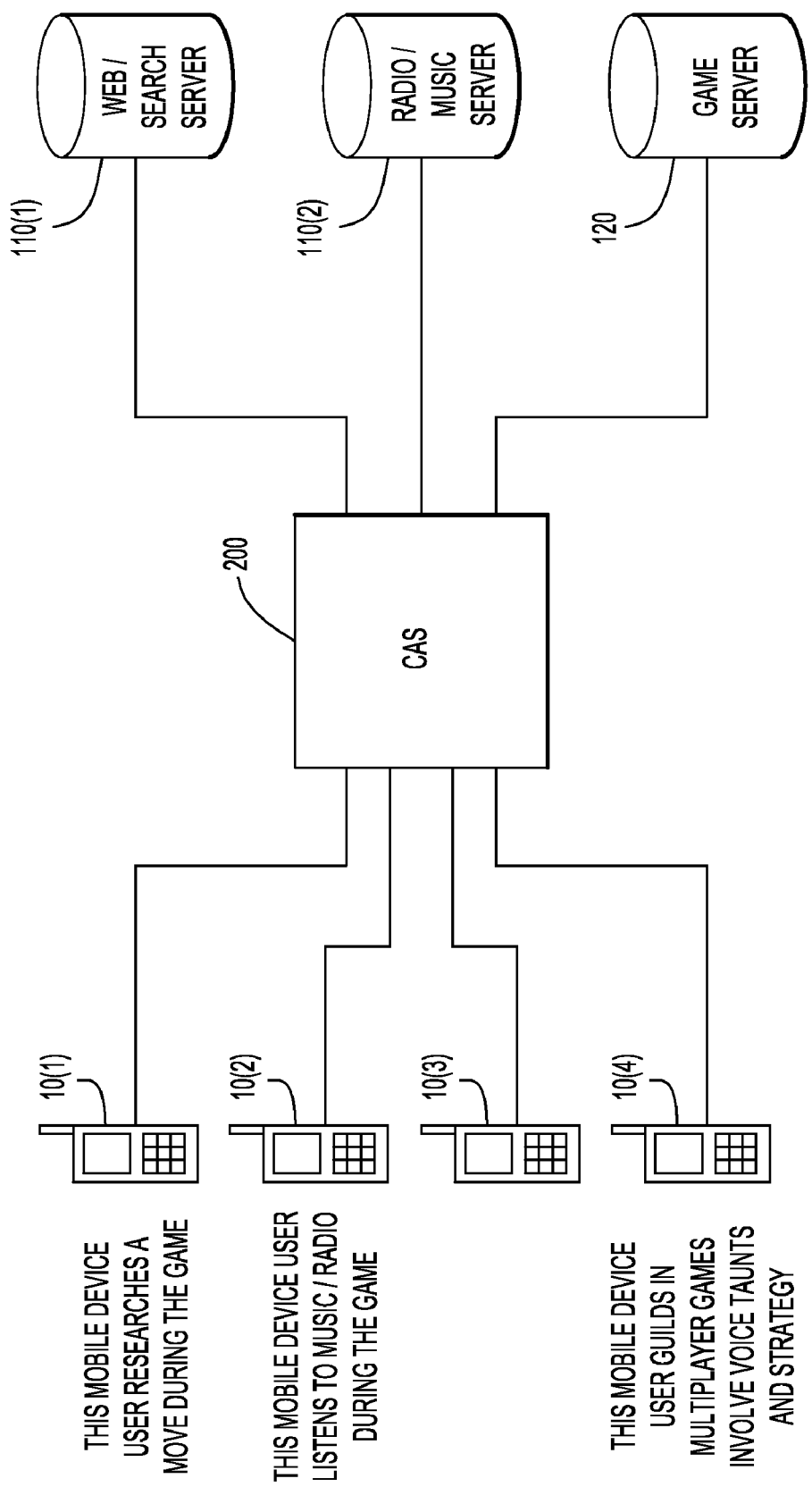
FIG. 7 is a diagram showing multiple device users participating in a gaming application concurrent with at least one other mobile application according to the exemplary embodiment shown in FIG. 6.

FIGS. 6 and 7 illustrate use of a concurrency application for a mobile gaming situation. In this example, there are multiple mobile device users engaged in a particular mobile game. A mobile device user may want to have real-time communication with another mobile device user while playing the game, but typing an instant message (if the gaming application supported it) is too tedious. Alternatively, a mobile device user may wish to listen to streaming music audio or to research a particular move or play for the game while playing the game. There is a concurrency plug-in to a game server application that enables concurrent voice chatting during game play using, for example, a voice-over-IP (VoIP) service over the data network. The CAS 200 manages the chat participation and interaction with the game application. This type of real-time connection and interaction between mobile device users greatly enhances the game experience for multiple mobile device users.

As specifically shown in FIG. 6, users at two mobile devices 10(1) and 10(2) are shown at 510 connected to a game server via the GGSN/PDSN 100. A game context determines a need to provide voice communication between mobile device users at 520. At 530, the CAS 200 establishes a voice call between the users at mobile devices 10(1) and 10(2) while simultaneously maintaining each user's participation in the game application served by a game server 120. This is not limited to two mobile devices. As shown in FIG. 7, users at mobile devices 10(1), 10(2), 10(3) and 10(4) may seamlessly (voice) chat with each other within the context of the mobile game application. Multiple voice chat groups may be created dynamically depending on the game and desired application. Taunting groups (with opponents) and strategy groups (with team members) may be created as an example to permit the players to play the game and engage in strategy discussions as well as taunting the opponents.

One enhancement during a mobile gaming session is to provide the capability for the mobile device users to converse with each other using voices other than their own. A desire for anonymity or an ability to talk in a celebrity-voice enhances the gaming experience. The computer processing power of most mobile phones is very limited and cannot perform extensive voice morphing capabilities. The morphing of the voices could be performed in a server based in the mobile network.

For example, a mobile device user is currently on a network that is capable of transporting his/her voice from the handset to an application server in the packet/data domain (e.g., voice over IP). In this case the application server that may reside in the voice network 50 or data network 90 receives the voice audio from the mobile device user, morphs the voice audio as per the effects desired by the mobile device user and relays the morphed voice audio to the other mobile device user participant(s) in the game. In another example, a mobile device user is on a network that is not capable of transmitting voice from the handset in the packet domain. In this case the user communicates the desired messages to an application server through a text chat session. The text chat session may contain pre-defined codes for voice messages that the server would in turn play out to the other participants. It is also possible for the application server to have a text-to-speech engine that will convert the typed text messages from the user to speech and then morph the speech with the desired effects and play the modified speech to the other participant(s) in the session.

While the foregoing description of FIGS. 6 and 7 has been made with respect to multiple users participating in a mobile gaming application, there are other non-gaming applications. For example, multiple mobile device users may be collaborating on a mobile productivity application matter, such as a document, image, video, etc., managed by a server in the data network 90. During this collaborative project, the mobile device users may want to have a voice discussion. Thus, the concurrent voice call between two or more mobile device users is set up as described above so that the mobile device users can conduct a voice conversation while concurrently viewing and/or supplying data input to the collaborative project.

Figure 8:
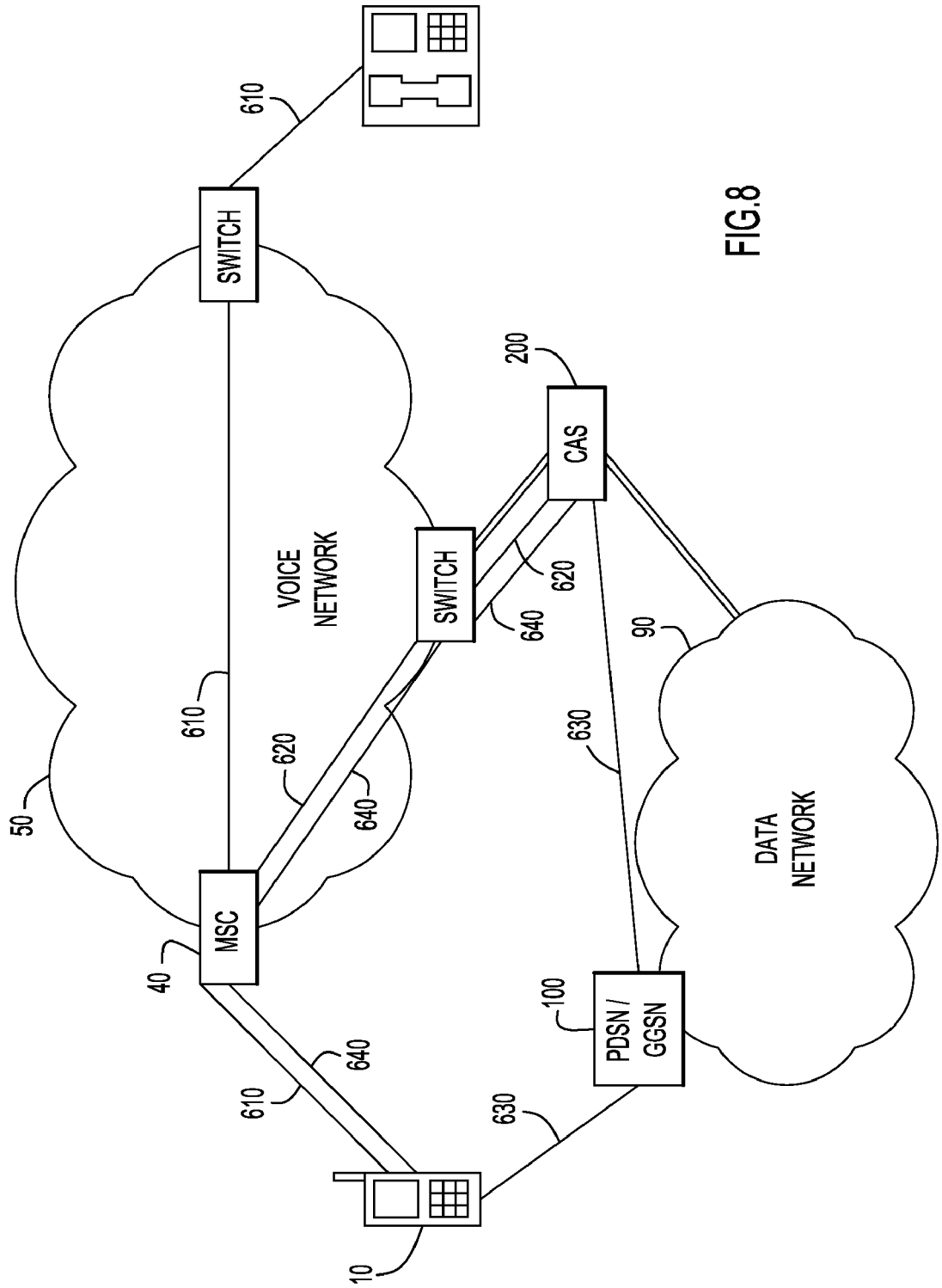
FIG. 8 is a block diagram showing a mobile device user may conduct a data session concurrent with a voice call according to an embodiment of the invention.

Turning to FIG. 8, a method is described to provide concurrent voice and data over data networks, such as CDMA1x or GPRS. The CAS 200 is connected to the voice network 50 through any of the traditional methods such as ISUP, ISDN-PRI, etc. The called party in this case could be a land line device, a mobile device or another concurrency-enabled device. A technique is provided to enable the mobile device to switch between a voice mode and a data mode using the concurrency application plug-in enabler residing in the mobile device 10.

Operation is as follows. At 610, the mobile device user initiates a voice call to another person on a landline device or a mobile device, the "called party". During the conversation the mobile device user decides that a data session is needed to fetch information from the Internet or Intranet using the data network capability. When this occurs, the client library software on the mobile device sends a command to the voice network 50 that initiates a call transfer service that transfers the existing voice call to a phone number associated with the CAS 200, together with the indication that the mobile device user is trying to set up a concurrent data-voice call. The call transfer service is a service that is currently available in existing mobile cellular communication networks. The function of the call transfer service is shown in FIG. 8 by the connection at 620 between the MSC 40 and the CAS 200 via one or more voice network switches. This action connects the called party to the CAS 200 through the call transfer service.

The CAS 200 maintains the voice call to the called party on behalf of the mobile device user, while at 630, the client library software on the mobile device initiates a data session through the PDSN/GGSN 100 and the CAS 200 monitors the status of the data session. When the mobile device initiates the data session with ongoing or concurrent voice call, the CAS 200 maintains the leg of the voice call with the mobile device 10 using an IP or packet/data session, such as voice-over-IP (VoIP). The CAS 200 maintains the leg of the voice call with the called party using the standard time-division multiplex (TDM) voice call techniques. More specifically, at the CAS 200 receives voice from the mobile device in the form of VoIP packets, for example, and converts them to standard TDM signals that are supplied via the voice network to the called party. Conversely, the CAS 200 receives standard TDM signals from the called party and converts them to VoIP packets that are sent to the mobile device 10. By switching the leg of the voice call with the mobile device 10 to a packet-based call, (e.g., VoIP), the mobile device 10 is freed up to carry on a data session with the data network 90 via the CAS 200 while continuing to having a voice conversation with the called party. Again, while the voice call and data session are concurrently active, the leg of the voice call between the CAS 200 and the mobile device is carried by VoIP packets and the leg of the voice call between the CAS 200 and the called party is handled by standard TDM via the voice network 50.

During the data session, the client library in the mobile device 10 generates data requests directed to any data server in the data network 90 through the PDSN/GGSN functionality. During the data session, the CAS 200 is monitoring the data session enough to know that it is ongoing, but the flow of data packets goes in both directions between the client device 10 and the data network 90 without passing through the CAS 200. It should be understood to one with ordinary skill in the art that the data requests from the mobile device may include small amounts of user input/selected data as well.

After completion of the data session, the mobile device user can indicate the need to switch back to a standard voice session with the called party. Alternatively, the client library in the mobile device 10 automatically determines that a switch back to a standard voice call session is appropriate when the data session has been unused for a period of time except to carry voice traffic. In either case, at 640, the client library software disconnects the data session and dials a number into the CAS 200 for a new voice call. The CAS 200 recognizes the incoming call as part of the original call established previously and bridges the new incoming voice call to the same called party. Thus, a voice call through the voice network 50 between the mobile device 10 and the called party is reestablished. If the called party is at a concurrency-enabled mobile device then it is possible for him/her to switch back and forth between a voice and data session in the same way as mentioned above.

The embodiment of FIG. 8 is also useful to more intelligently switch between voice and data modes so that while a user is engaged in a data application, the ongoing voice service is switched to a lower quality voice service (e.g., VoIP), and then switched back to the higher quality voice service when the data session is idle or is terminated. For example, a mobile device user, user A, may be in a conversation with another mobile device user, user B. One or both users find the need to browse while engaged in the conversation. User A hits an information button on his/her mobile device screen and the CAS 200 seamlessly bridges the call to a lower quality voice service through a packet network. When one or both users finish browsing, or the browsing session goes idle, the CAS 200 seamlessly switches the voice call back to a higher quality service/link. Again, this may occur several times during the course of a voice call as described above.

Figure 9:
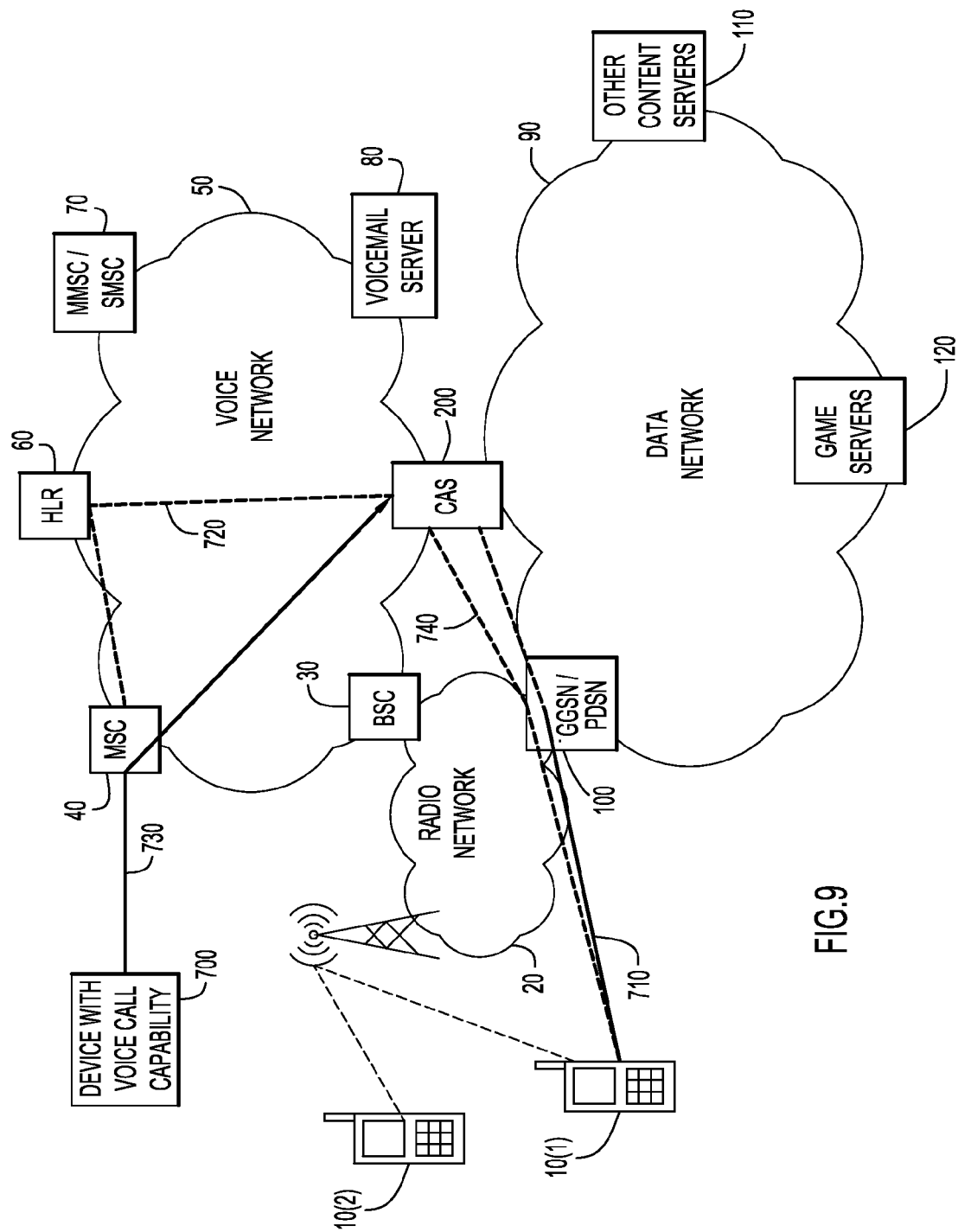
FIG. 9 is a block diagram depicting operation associated with a mobile internet call waiting feature according to an embodiment of the present invention.

Referring now to FIG. 9, another concurrency application example is described for a mobile internet call waiting feature. Mobile devices are increasingly being used to access data services in addition to the traditional voice services. One of the major drawbacks of the current mobile data networks is the undefined nature of interaction with voice services. Currently, a voice call indication does not even get to the mobile device when the call is made to it. In this case, the call is blindly forwarded to a voicemail service provided by a voice mail server 80 if available or a busy tone is played back to the caller if the user does not subscribe to the voicemail service. This is typically the behavior if the mobile station to which the call is destined is on a 2G system like the CDMA 1X (active) or uses a GSM GPRS session.

At 710, a mobile device user is on an active data session. The concurrency application plug-in in the mobile device 10(1) registers with the CAS 200 to indicate the active data session. At 720, the CAS 200 activates the IN trigger of the SS7/IN interface function 220 (FIG. 4) to receive notifications (from the MSC 40 and HLR 60) of all incoming calls to that mobile device user. Alternatively, the mobile device user may provide to the CAS 200 a list of callers and times/contexts when calls should be accepted for call waiting processing. In this way, voice call indication is not automatically forced on the mobile device user, potentially interrupting the mobile device user's current data session. Thus, the CAS 200 intercepts the incoming voice call to the mobile device user before notification of the incoming call reaches the mobile device.

At 730, an incoming call from a device 700 with voice call capability for that mobile device user occurs and it is routed to the CAS 200 due to the IN triggers managed by the SS7/IN interface function 220. At 740, the CAS 220 reviews the list of user-approved callers (if one is stored for that mobile device user) and sends a data message, text message, short audio message or other alert to the mobile device 10(1) to notify the mobile device user about the incoming voice call without interrupting the mobile device user's active data session. At that point, the user of mobile device 10(1) can determine whether or not to interrupt his/her data session and take the incoming voice call. To this end, the CAS 200 may be programmed to require that it receive a notification from the user of the mobile device that the voice call should be connected through to the mobile device. For example, the mobile device user may be presented with an on-screen option that allows the user to select YES or NO to accept the incoming call.

Figure 10:
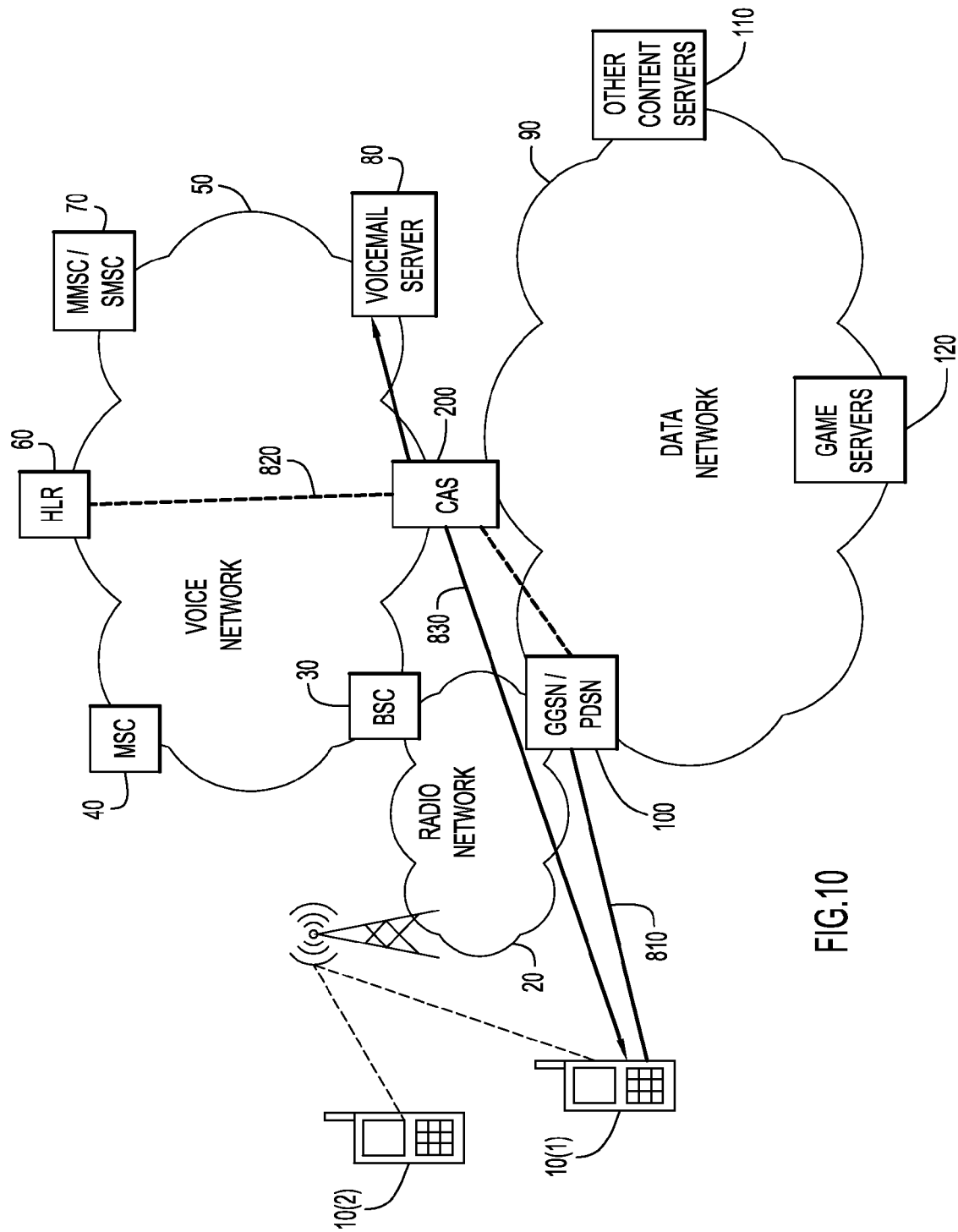
FIG. 10 is a block diagram depicting operation of voicemail delivery feature according to an embodiment of the present invention.

Turning to FIG. 10, yet another concurrency application, referred to as "whisper" voicemail, will be described. While a mobile device user is busy with a data application, a voicemail indication on the mobile device does not contain sufficient information for the mobile device user. The user could have chosen to ignore the call indication since it was from an unrecognized caller or the user could have chosen not to interrupt the data application session. The "whisper" voicemail application is useful where a user wishes to have a preview of a voicemail message left by another party through the existing context of an ongoing data session.

At 810, the mobile device 10(1) is in an active data application session. The concurrency application client plug-in in mobile device 10(1) registers with the CAS 200 indicating the active data session. At 820, the CAS 200 uses the SS7/IN interface function 220 (FIG. 4) to determine if the mobile device user has unretrieved voicemail messages. At 830, the CAS 200 retrieves voicemail messages from the voicemail server 80 and "whispers" the voicemail message or a portion of the voicemail message to the user of the mobile device 10(1) within the context of the current data application session. For example, the CAS 200 may stream audio of a voicemail message to the mobile device 10(1) during the data application session. Alternatively, or if desired, the CAS 200 converts the audio of the voicemail message to text and sends a preview of the voicemail message as a text message that is displayed on the mobile device 10(1) to the user. The amount (initial x seconds or the entirety) of the voicemail message that is delivered to the mobile device user may be user defined.

In this example, the user of mobile device 10(1) may be engaged in a particular data application on the mobile device such as a gaming application or an instant messaging application. The CAS 200 includes a concurrency plug-in to the third party voicemail server 80 that allows the mobile device user to request concurrent information while engaged in the data application. Moreover, after notifying the mobile device user of a unretrieved voicemail message but before delivering "whispering" the voicemail message to the CAS 200 may present the mobile device user with options for selecting the medium by which it is delivered (audio or text) and the amount of the voicemail message that is delivered (a portion of all of it) while the mobile device user is engaged in the application.

The device and methods described herein may be embodied in other specific forms without departing from the spirit or essential characteristics thereof. The foregoing embodiments are therefore to be considered in all respects illustrative and not meant to be limiting.

What is claimed is:

1. A method for providing multiple concurrent applications to a mobile communication device, comprising:
    at a server apparatus connected to a voice network and to a data network, engaging the mobile communication device in a first mobile communication application comprising establishing a voice call between the mobile communication device and a destination party via a voice network; and
    at the server apparatus, while the mobile communication device is engaged in the first mobile communication application, engaging the mobile communication device in a second mobile communication application comprising establishing a data session with the data network concurrent with said voice call, wherein said establishing comprises receiving an indication at the application server from the mobile communication device to initiate said data session concurrent with said voice call, transferring the voice call to the application server via a call transfer service, maintaining the voice call between the mobile communication device and the destination party by communicating with the mobile communication device using a voice over packet service and communicating with the destination party using standard voice network time division multiplexing services.

2. The method of claim 1, wherein said engaging the mobile communication device in the first mobile communication application and said engaging the mobile communication device in the second mobile communication application are performed without modification to an existing communication protocol for over-the-air communications between the mobile communication device and equipment in a wireless network that communicates with the mobile communication device.

3. The method of claim 1, wherein said engaging the mobile communication device in the first mobile communication application and said engaging the mobile communication device in the second mobile communication application comprise interacting between a client process in the mobile communication device and the server apparatus to coordinate activity associated with the first and second mobile communication applications in such a manner that user of the mobile communication device concurrently experiences the first and second mobile communication applications.

4. The method of claim 1, wherein the second mobile communication application is one of: a mobile instant messaging application, a mobile web browsing application, and a mobile streaming application for streaming video, music, radio, voicemail messages and other content to the mobile communication device.

5. The method of claim 1, wherein said engaging the mobile communication device in the second mobile communication application comprises, at said server apparatus, connecting requests from said mobile communication device to said data network and transmitting data responses from the data network to said mobile communication device.

6. The method of claim 1, and further comprising at the mobile communication device, switching between the voice call and the data session.

7. The method of claim 1, and further comprising receiving at the server apparatus an indication from the mobile communication device to terminate the data session and in response said server apparatus returning the voice call between the mobile communication device and the destination party to the voice network.

8. The method of claim 7, wherein upon terminating the data session, further comprising: at the mobile communication device, dialing a telephone number associated with the server apparatus; and at said server apparatus, recognizing an incoming call from said mobile communication device as being associated with the original voice call between the mobile communication device and said destination party, and connecting said incoming call to the destination party by way of said voice network so that the voice network resumes managing the voice call between the mobile communication device and the destination party.

9. A system for providing multiple concurrent applications to a mobile communication device, comprising:
    at least one mobile communication device comprising a client software process that coordinates multiple concurrent mobile applications on the mobile communication device; and
    an application server that interfaces with a mobile communication service provider facility to communicate with said mobile communication device, wherein the application server also interfaces with a voice network and a data network in order to serve the mobile communication device with access to the voice network and the data network, wherein the application server communicates with the client software process in said mobile communication device in order to serve multiple concurrent mobile applications to the mobile communication device;
    wherein the application server receives an indication from said mobile communication device to initiate a data session concurrent with an existing voice call between the mobile communication device and a destination party, wherein said client software process in the mobile device invokes a call transfer service to transfer the voice call to said application server after which the application server manages the voice call between the mobile communication device and the destination party by way of a voice packet service between the application server and the mobile communication device and by way of standard voice network time division multiplexing services between the application server and the destination party.

10. The system of claim 9, wherein the application server and the client process in the mobile communication device communicate to enable multiplexing between multiple concurrent mobile applications at the mobile communication device without modification to an existing communication protocol for over-the-air communications between the mobile communication device and equipment in a wireless network that communicates with the mobile communication device.

11. The system of claim 9, wherein the application server and the client process coordinate activity associated with first and second mobile communication applications at the mobile communication device, wherein the first mobile communication application is a mobile non-voice call application and the second mobile communication application is one of: a voice call, a mobile instant messaging application, a mobile web browsing application, and a mobile streaming application for streaming video, music, radio, voicemail messages and other content to the mobile communication device.

12. The system of claim 9, wherein the application server and the client software process coordinate activity associated with first and second mobile communication applications at the mobile communication device, wherein the first mobile communication application is one of: a voice call, a mobile instant messaging application, a mobile web browsing application, and a mobile streaming application for streaming video, music, radio, voicemail messages and other content to the mobile communication device.

13. The system of claim 9, wherein the application server manages said data session by receiving data requests from the client software process in the mobile communication device, and connects said data requests to said data network, and receiving data responses to said data requests from the data network and transmitting said data responses to said mobile communication device.

14. The system of claim 13, wherein said client software process in the mobile communication device coordinates switching between the voice call and the data session.

15. The system of claim 13, wherein the application server receives an indication from the mobile communication device to terminate the data session and in response thereto returns management of the voice call between the mobile communication device and the destination party to the voice network.

16. The system of claim 15, wherein the client software process in the mobile communication device, upon terminating the data session, initiates dialing of a telephone number associated with the application server, and wherein the application server recognizes the incoming call from the mobile communication device as being associated with the original voice call between the mobile communication device and the destination party and connects the incoming call to the destination party by way of said voice network so that the voice network resumes managing the voice call between the mobile communication device and the destination party.

17. A system for providing multiple concurrent applications to a mobile communication device, comprising:
at least first and second mobile communication devices each comprising a client software process that coordinates multiple concurrent mobile applications on the respective first and second mobile communication devices; and
an application server that interfaces with a mobile communication service provider facility to communicate with said first and second mobile communication devices, wherein the application server also interfaces with a voice network and a data network in order to serve the first and second mobile communication devices device with access to the voice network and the data network, wherein the application server communicates with the client software process in said first and second mobile communication devices in order to serve multiple concurrent mobile applications to the first and second mobile communication devices;
wherein the application server connects said first and second mobile communication devices to a first server that enables users of said first and second mobile communication devices to participate in a competitive or cooperative manner with each other in a context of a first mobile application, and wherein the application server further serves a second mobile application concurrently with said first mobile application to the first and second mobile communication devices, wherein said second mobile application allows for communication between users of said first and second mobile communication devices while they participate in said first mobile application.

18. The system of claim 17, wherein the second mobile application is a voice call between said first and second mobile communication devices, and wherein said first mobile application is a mobile gaming application.

19. The system of claim 17, wherein the second mobile application is a voice call between said first and second mobile communication devices, and wherein said first mobile application is a mobile productivity application.

20. The system of claim 17, wherein said application server connects said second mobile communication device to a voice application server that provides said second mobile application which morphs voice audio supplied by a user of the first mobile communication device with one or more effects and delivers morphed audio to said second mobile communication device while users of the said first and second mobile communication devices are participating in said first mobile application.

21. The system of claim 17, wherein said application server connects said first mobile communication device to a voice-to-text application server that provides said second mobile application which receives voice audio from the first mobile communication device, converts the voice audio to text and delivers a text message to said second mobile communication device while users of said first and second mobile communication devices are participating in said first mobile application.

22. The system of claim 17, wherein said second mobile application is a text messaging application whereby a user of said first mobile communication device supplies text or a code that is converted to text which is delivered to said second mobile communication device while users of said first and second mobile communication devices are participating in said first mobile application.

23. A system for providing multiple concurrent applications to a mobile communication device, comprising:
at least one mobile communication device comprising a client software process that coordinates multiple concurrent mobile applications on the mobile communication device; and
an application server that interfaces with a mobile communication service provider facility to communicate with said mobile communication device, wherein the application server also interfaces with a voice network and a data network in order to serve the mobile communication device with access to the voice network and the data network, wherein the application server communicates with the client software process in said mobile communication device in order to serve multiple concurrent mobile applications to the mobile communication device, wherein said application server intercepts an incoming voice call to said communication device before notification of the incoming voice call reaches said mobile communication device, and said application server sends a notification to said communication device without interrupting an ongoing data application engaged in by said mobile communication device.

24. The system of claim 23, wherein said application server sends one of a text message, audio message or other alert to said mobile communication device.

25. The system of claim 23, wherein said application server compares call context information associated with the incoming call with stored profile information for said mobile communication device, and wherein the application server sends the notification of the incoming voice call to the mobile communication device based on correlation of said call context information with said stored profile information.

26. The system of claim 23, wherein said application server connects said incoming voice call to said mobile communication device upon receiving from said mobile communication device an indication of a user's desire to allow the incoming voice call to be connected to said mobile communication device.

27. The system of claim 23, wherein said application server retrieves a voicemail message left by a caller for said mobile communication device, and while said mobile communication device is engaged in said data application, said application server sends at least a portion of the voicemail message to said mobile communication device without interrupting said data application.

28. A system for providing multiple concurrent applications to a mobile communication device, comprising:
   at least one mobile communication device comprising a client software process that coordinates multiple concurrent mobile applications on the mobile communication device; and
   an application server that interfaces with a mobile communication service provider facility to communicate with said mobile communication device, wherein the application server also interfaces with a voice network and a data network in order to serve the mobile communication device with access to the voice network and the data network, wherein the application server communicates with the client software process in said mobile communication device in order to serve multiple concurrent mobile applications to the mobile communication device, wherein said application server retrieves a voicemail message left by a caller for said mobile communication device, and while said mobile communication device is engaged in a data application, said application server sends at least a portion of the voicemail message to said mobile communication device without interrupting said data application.

29. The system of claim 28, wherein said application server converts at least a portion of said voicemail message to text and sends said text to said mobile communication device.

* * * * *